United States Patent [19]
Nishino et al.

[11] Patent Number: 5,615,378
[45] Date of Patent: Mar. 25, 1997

[54] DICTIONARY RETRIEVAL DEVICE

[75] Inventors: Fumihito Nishino; Naomi Sugimoto, both of Kawasaki, Japan

[73] Assignee: Fujitsu Limited, Kawasaki, Japan

[21] Appl. No.: 235,653

[22] Filed: Apr. 29, 1994

[30] Foreign Application Priority Data

Jul. 19, 1993 [JP] Japan ............... 5-178209

[51] Int. Cl.⁶ ................... G06F 17/28
[52] U.S. Cl. ............ 395/754; 395/757; 395/759
[58] Field of Search ............ 364/419.9–419.11

[56] References Cited

U.S. PATENT DOCUMENTS

| | | | |
|---|---|---|---|
| 4,758,977 | 7/1988 | Morimoto et al. | 364/419 |
| 4,980,829 | 12/1990 | Okajima et al. | 364/419 |
| 5,214,583 | 5/1993 | Miike et al. | 364/419 |

Primary Examiner—Robert A. Weinhardt
Assistant Examiner—Frantzy Poinvil
Attorney, Agent, or Firm—Staas & Halsey

[57] ABSTRACT

A dictionary retrieval device is constructed by a conversion character definition form for providing group IDs for character subsets, a character-group ID conversion part for replacing a character with a group ID, an input character string conversion part for converting the input character string input from the input part to an input group ID, a dictionary conversion part for converting a word dictionary to a converted word dictionary defined by a notation group ID string, and a dictionary retrieval part for retrieving the converted word dictionary by the input group ID string. The dictionary retrieval device can retrieve a word from a dictionary which could not have been retrieved from a dictionary due to an input error, in the past, by regarding elements of character set defined by a conversion character definition form as the same element.

15 Claims, 15 Drawing Sheets

Fig.1

| No. | | INCORRECT INPUT CHARACTER STRING | CORRECT CHARACTER STRING |
|---|---|---|---|
| 1 | N | コンピュー タ | コンピュー タ |
| | P | (KO) (N) (PI) (YU) (MINUS) (TA) | (KO) (N) (PI) (YU) (—) (TA) |
| 2 | N | バーサー | バーザー |
| | P | (PA) (—) (SA) (—) | (PA) (—) (ZA) (—) |
| 3 | N | 独撞場 | 独撞場 |
| | P | (DO) (DAN) (JOU) | (DO) (SEN) (JOU) |
| 4 | N | とまと | トマト |
| | P | (TO) (MA) (TO) | (TO) (MA) (TO) |
| 5 | N | 瀧澤 | 滝沢 |
| | P | (TAKI) (ZAWA) | (TAKI) (ZAWA) |

N : NOTATION  (—) : LONG VOWEL SYMBOL
P : PRONUNCIATION

Fig.4

| | INCORRECT INPUT CHARACTER STRING | CORRECT CHARACTER STRING |
|---|---|---|
| N | コ ン ピ ュ ー タ | コ ン ピ ュ ー タ |
| P | (KO) (N) (HI) (YU) (—) (TA) | (KO) (N) (PI) (YU) (—) (TA) |

(—) : LONG VOWEL SYMBOL

N : NOTATION
P : PRONUNCIATION

Fig.7A

| | INPUT STRING | | | | | |
|---|---|---|---|---|---|---|
| N | タ | ン | ゴ | を | 踊 | る |
| P | (TA) | (N) | (GO) | (WO) | (ODO) | (RU) |

N : NOTATION  
P : PRONUNCIATION

Fig.7B

| No. | PARTIAL CHARACTER STRING |
|---|---|
| 1 | タ ン ゴ を 踊 る |
| 2 | タ ン ゴ を 踊 |
| 3 | タ ン ゴ を |
| 4 | タ ン ゴ |
| 5 | タ ン |
| 6 | タ |

Fig.10

| READ CHARACTER | N | コ | ン | ピ | ュ | ー | タ |
|---|---|---|---|---|---|---|---|
| | P | (KO) | (N) | (PI) | (YU) | (—) | (TA) |
| CANDIDATE CHARACTER STRING | N | (コ, ヨ) | (ン, ヽ, ヨ) | (ヒ, ビ, ピ) | (ユ, ュ, ヱ) | (—, 、, ー) | (タ, ク) |
| | P | (KO) (YU) | (N) (SHI) | (PI) (BI) | (YU) | (—) (MINUS) | (TA) (KU) |

N : NOTATION   (—) : LONG VOWEL SYMBOL
P : PRONUNCIATION

Fig.11

| REPRESENTATION CHARACTER | MEMBER CHARACTER |
|---|---|
| コ (KO) | ゴ (GO) , ユ (YU) , ュ (YU) |
| ソ (SO) | ン (N) , ゾ (ZO) |
| ヒ (HI) | ビ (BI) , ピ (PI) |
| 一 (ONE) | ー (MINSU) , (ー) |
| ク (KU) | グ (GU) , タ (TA) , ダ (DA) |
| ウ (U) | フ (FU) , 7 (SEVEN) , 1 (ONE) |
| シ (SHI) | ツ (TSU) |

( ) : PRONUNCIATION
(ー) : LONG VOWEL SYMBOL

Fig.12

| GROUP No. | MEMBER CHARACTER |
|---|---|
| 1 | コ (KO), ゴ (GO), ユ (YU), ュ (YU) |
| 2 | ソ (SO), ン (N), ゾ (ZO) |
| 3 | ヒ (HI), ビ (BI), ピ (PI) |
| 4 | ー (ONE), ー (—), ー (MINSU) |
| 5 | ク(*) (KU), グ (GU), タ (TA), ダ (DA) |
| 6 | ウ (U), フ (FU), 7 (SEVEN), 1 (ONE), ク(*) (KU) |
| 7 | シ (SHI), ツ (TSU) |

( ) : PRONUNCIATION
(—) : LONG VOWEL SYMBOL

Fig.13

| GROUP No. | MEMBER CHARACTER |
|---|---|
| 1 | 加 , 力 , 口 , 力 , 口<br>(KA) (KA) (RO) (RIKI) (KUCHI) |
| 2 | 仁 , イ , 二 , イ , 二<br>(JIN) (I) (NI) (I) (TWO) |
| 3 | 結 , 糸 , 吉<br>(KETSU) (ITO) (KICHI) |

( ) : PRONUNCIATION

Fig.15

| GROUP ID | MEMBER CHARACTER |
|---|---|
| 1 | カ , 力<br>(KA) (RIKI) |
| 2 | ロ , 口<br>(RO) (KUCHI) |
| 1 , 2 | 加<br>(KA) |
| 3 | イ<br>(I) |
| 4 | 二 , 二<br>(NI) (TWO) |
| 3 , 4 | 仁<br>(JIN) |
| 5 | ヒ<br>(HI) |
| 3 , 5 | 化<br>(KA) |

( ) : PRONUNCIATION

Fig.16

| GROUP ID | PATTERN STRING |
|---|---|
| 4, 101, 20 | え ～ ＊ と<br>(E) (-) ( ) (TO) |

( ) : PRONUNCIATION
(-) : LONG VOWEL SYMBOL

DICTIONARY RETRIEVAL DEVICE

BACKGROUND OF THE INVENTION

1. Field of the Invention

The present invention relates to a dictionary retrieval device for using word processing for documents which are written in Japanese, Chinese, Korean, English or some other language. Further, the present invention relates to a device which executes form element analyses, incorrect character correction, character standardization or after character recognition processing by using the dictionary retrieval device.

2. Description of the Related Art

In recent years, computers, such as word processors, personal computers, workstations or the like, came into widespread use. When using these computers, it is often desired to execute various document processes such as translation, retrieval or distribution of a document using the computer. When executing the process of translation or the like, it is necessary to store the document into the computer, and execute form element analysis for sentences in the document with reference to a word dictionary.

Usually form element analysis is executed on the assumption that the input character string is correctly input into the computer. To correctly execute form element analysis, it is necessary that the document sentences be correctly input.

However, in practice, when a input character string is input, a different character string which was not intended by a system developer is often input.

Examples of incorrect input character strings and corresponding correct character strings written in Japanese characters are shown in FIG. 1. In FIG. 1, pronunciations are shown in patenthese for each character string. At No. 1 in FIG. 1, the correct character string "(ko)(n)(pi)(yu)(-)(ta)" means "computer" in English. In the incorrect one, an incorrect character "(minus)" is used instead of a long vowel symbol "-". At No. 2, the correct character string "(pa)(-)(za)(-)" means "parser" in English. In the incorrect one "(pa)(-)(sa)(-)", a voiced sound symbol of third character "(za)" is incorrect. At No. 3, the correct character string "(doku)(sen)(jou)" means "be unrivaled" in English. In the incorrect one "(doku)(dan)(jou)", a second kanji (kanji is a chinese character) is similar in shape to the correct one but different in meaning. The three input mistakes in the above examples are all due to use of similar characters.

At No. 4, both the correct character string and the incorrect character string have the same pronunciation "to ma to" and the same meaning "tomato" in English. The incorrect character string is input in hiragana (a type of Japanese syllabary) instead of being correctly input by katakana (another type of Japanese syllabary). In this case, the incorrect character string is allowable notation as a spelling variation, however, a computer system treats it as an incorrect character string.

The above differences between the correct character string and the incorrect character string are insignificant for a human. However, if only the correct words are registered in a dictionary which is used in a translation system or the like, a problem occurs resulting in incorrect analyses.

At No. 5, both the correct character string and the incorrect character string show a Japanese family name "takizawa". The pronunciation and meaning are the same but the characters are different (new and old style). These different character styles are used when a document is written in different environments, for example, written by different people or by using different kana-kanji conversion dictionaries (i.e., Japanese character-Chinese character conversion dictionary). The correct character string is written using the new character style, and the incorrect character string is written using the old character style. And if the old style characters which are not standard are not registered in a system dictionary, such an incorrect character string is output as an unregistered word, and the correct candidate is not shown in a usual morphology analysis.

Further, a usual character recognition processing device such as a printed character reader, a handwritten input character reader or the like, outputs plural candidate characters for each read character. When input characters are obtained by using a character recognition processing device, an after character recognition processing device receives plural candidate characters for each input character, and retrieves characters from a dictionary by using combinations of the candidate character. If there are m candidate characters for each character of a character string having n length, the after character recognition processing device retrieves from a dictionary $m^n$ combinations of character strings. Therefore, the number of candidate characters increases, and the number of the combinations of candidate characters also increases, so that the speed of the after character recognition process becomes slow.

To increase the speed of the after character recognition process, in the usual manner, an attempt is made to reduce the number of candidate characters for each character position to m' candidate characters (m'<m). However, by trying to reduce this number, if the correct character is excluded from the m' candidate characters, the correct word cannot be retrieved.

SUMMARY OF THE INVENTION

Therefore, the present invention has as its object the provision of a dictionary retrieval device which can retrieve from a dictionary words which could not be retrieved from the dictionary due to an input error in the past, by regarding elements of a character set defined by a conversion character definition form, as the same element.

The present invention has as another object the provision of a morphology analysis device which permits input errors, by using the above-mentioned dictionary retrieval device which can retrieve from a dictionary a word which could not be retrieved from the dictionary in the past.

The present invention has as a further object the provision of a character string correction device which can carry out character standardization and correct erroneous words by using the above-mentioned dictionary retrieval device which can retrieve from a dictionary a word which could not be retrieved in the past.

The present invention has as a further object the provision of an after character recognition processing device which can increase the process speed thereof by reducing the number of candidate groups at each character position and the number of combinations of the candidate characters, by managing to group the candidate characters at each character position of output of a character recognition process device.

To achieve the above-mentioned objects, the present invention comprises a dictionary retrieval device which converts a character string input from an input part and outputs the converted character string to an output part, by using a conversion character definition form, a character-group ID conversion part, an input character string conversion part, a word dictionary, a dictionary conversion part, a converted word dictionary, and a dictionary retrieval part, which will be explained hereinafter. The conversion character definition form is formed by classifying a character set $C=\{c_1, c_2, \ldots, c_n\}$ into subsets $(G_i \subset C)$, and providing group IDs for each subset. The character-group ID conversion part replaces each character of the character string with group IDs by using the conversion character definition form. The input character string conversion part converts the input character string input from the input part to an input group ID string by calling the character-group ID conversion part. The word dictionary stores words which are significant partial character strings appearing at the input part. The dictionary conversion part converts a notation character string of each word which is defined in the word dictionary to a notation group ID string by calling the character-group ID conversion part. The converted word dictionary stores words which are converted by the dictionary conversion part. The dictionary retrieval part retrieves the converted word dictionary expressed by the notation group ID for the input group ID string converted at the input character string conversion part.

Grammar G is denoted as $G=(N, \Sigma, P, S)$ by a set of non-terminal symbols N, a set of terminal symbols $\Sigma$, an assembly of productions P and a starting symbol S. Language L in the grammar G is denoted as $L(G)=\{t \mid S \rightarrow^* t \wedge t \in \Sigma^*\}$, in which, $E^*$ is an assembly of strings formed by symbols of $\Sigma$ each having a length of more than 0.

Now, assuming that $\omega, \omega'$ are words, they are comprised of strings of characters $c_i$, $\omega=c_1, c_2, \ldots, c_i, \ldots, c_n$ is a terminal symbol belonging to $\Sigma$, and $\omega'=c_1, c_2, \ldots, c_i', \ldots, c_n$ is a terminal symbol not belonging to $\Sigma$. If there is a direction $S \rightarrow^* \mu\omega\nu$ but there is not $S \not\rightarrow^* \mu\omega\nu$, the grammar G does not accept the language L(G) any more by only changing $c_i$ to $c_i'$. That is, correct analysis cannot be executed if there is even one incorrect character.

In the present invention, it is possible to introduce a conversion F $(F(\omega)=F(\omega'))$ which treats $c_i$ and $c_i'$ as the same group by using a conversion character definition form. Now, grammar $G_F=(N, F(\Sigma), P, S)$ is defined, and language $L(G_F)$, accepted by using the grammar $G_F$, becomes $L(G_F)=\{t \mid S \rightarrow^* F(t) \wedge F(t) \in \Sigma^*\}$. Now, if there is a derivation $S \rightarrow^* F(\mu)F(\omega)F(\nu)$ at the grammar $G_F$, there also is a derivation $S \rightarrow^* F(\mu)F(\omega')F(\nu)$ from $F(\omega)=F(\omega')$. That is, the analysis is correctly executed even though there are errors among characters which are mapped in the same group by the conversion character definition form.

For example, in the above-mentioned case of No. 1 in FIG. 1, if the long vowel symbol "(-)" and the minus symbol "(minus)" are defined as the same group, even if only the correct character string is defined in a dictionary, the correct word using the correct long vowel symbol "(-)" can be located instead of the input incorrect character string using the minus symbol "(minus)", therefore, the character string can be corrected.

At No. 5 in FIG. 1, if each of the different character styles are defined as the same group, and only the correct character string using the new character style is registered, the correct word can be retrieved using the new character style instead of the incorrect word input using the old character style, and therefore, standardization of the character string can be carried out.

In another aspect of the present invention, in a sentence analysis device like a machine translation or a natural language interface, a form element analysis device which permits input errors is comprised of an input part, an extended dictionary retrieval part, grammar rules, and a grammar checking part. The input part inputs sentences to the extended dictionary retrieval part. The extended dictionary retrieval part includes the above-mentioned dictionary retrieval device and retrieves sentences output from the input part. The grammar checking part executes the form element analysis on the result of the dictionary retrieval by referring to the grammar rules and outputs the result of the morphology analysis with dictionary information.

In a further aspect of the present invention, in the morphology analysis device, a character string correction device is provided by establishing a morphology composition part which composes the results of the morphology analysis by the grammar checking part and outputs sentences.

In a further aspect of the present invention, in the morphology analysis device, an after character recognition processing device is provided by inputting into the input part the candidate character strings output from the character recognition processing device, and establishing a morphology decision part between the grammar checking part and the output part. The candidate character strings have plural candidate characters for each character of an input character string obtained by the character recognition processing device. The element decision part outputs form morphology analysis candidates to the output part by deciding candidate rank by using a suitable evaluation function from the plural morphology analysis candidates obtained from results of the morphology analysis by the grammar checking part.

In the after character recognition processing device, the candidate characters input from the character recognition processing device are converted to group numbers corresponding to each of the candidate characters. Therefore, the conversion character definition form is defined in advance as the similar characters which are easily misread by the character recognition process device are grouped into the same groups. Therefore, the number of groups of the candidate characters decreases, and the number of the combinations of the candidate characters which refers to a dictionary decreases. And, although the candidate characters which are output from the character recognition processing device include an incorrect character, if there is a correct character similar to the incorrect character in the same group, the correct word can be looked up.

BRIEF DESCRIPTION OF THE DRAWINGS

FIG. 1 shows examples of incorrect input character strings and corresponding correct character strings which are input from an input part to a dictionary retrieval device.

FIG. 4 shows an example of incorrectly input character strings and corresponding correct character strings which are input from an input part in FIG. 2.

FIG. 7A shows an input string which is input from an input part in FIG. 6, and FIG. 7B shows character strings obtained from the input string of FIG. 7A.

FIG. 10 shows an example of read character and candidate character string of FIG. 9.

FIG. 11 shows an example of a conversion character definition form of the fifth embodiment according to the present invention.

FIG. 12 shows an example of a conversion character definition form of the sixth embodiment according to the present invention.

FIG. 13 shows an example of a conversion character definition form of the seventh embodiment according to the present invention.

FIG. 15 shows an example of a conversion character definition form of the eighth embodiment according to the present invention.

FIG. 16 shows an example of a conversion character definition form of the ninth embodiment according to the present invention.

DESCRIPTION OF THE PREFERRED EMBODIMENTS

Figure 2:
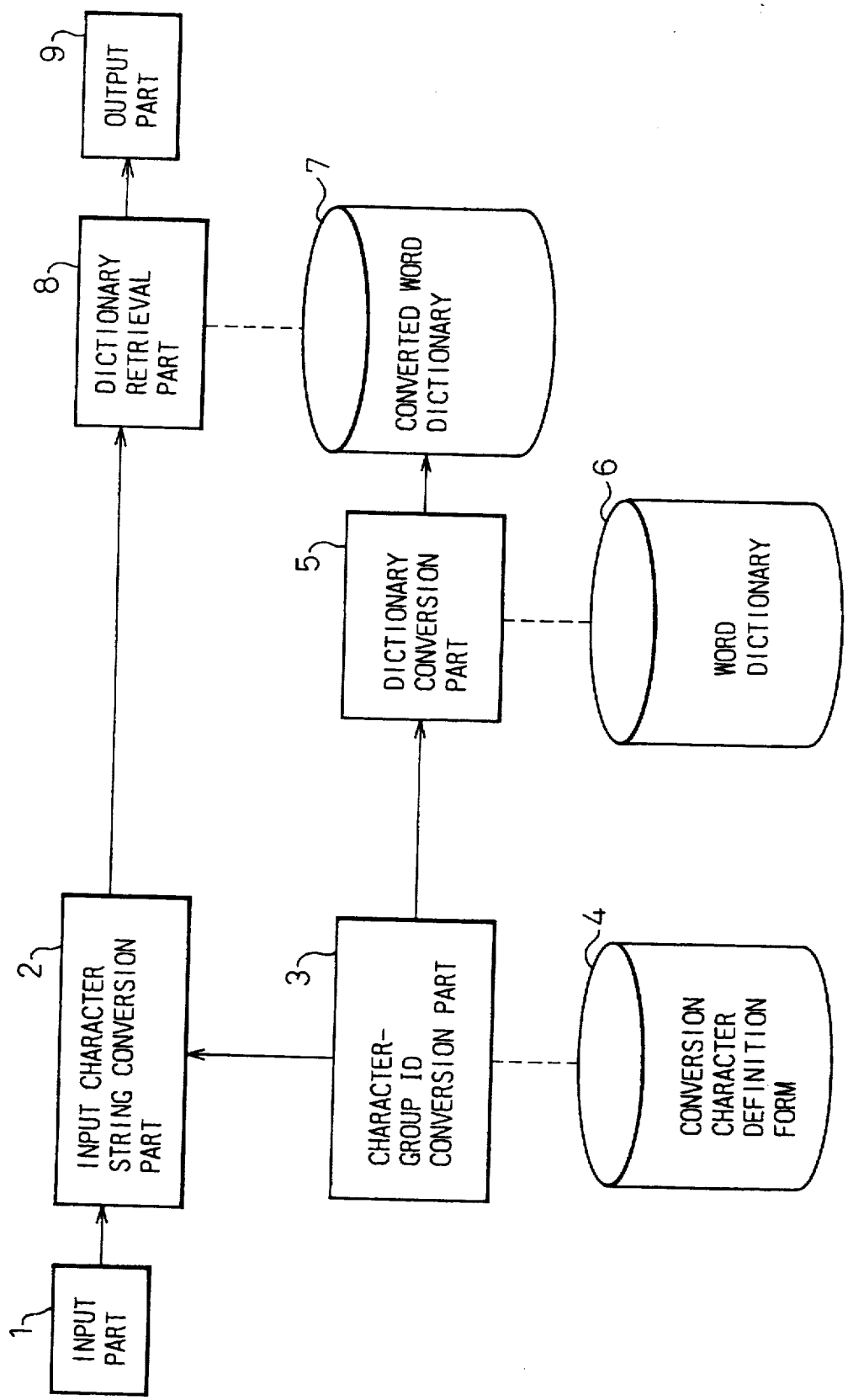
FIG. 2 is a block diagram of the first embodiment according to the present invention.

Embodiments of a dictionary retrieval device, a morphology analysis device, a character string correction device, and an after character recognition device according to the present invention, which are applied to a word processing in the Japanese language will be described hereinafter. However, the present invention also can be applied to languages other than the Japanese language, such as English, Chinese, Korean, and so on. Further, the present invention can be applied to not only a natural language but also an artificial language like a programming language which has a defined vocabulary and grammar rules.

In the following description of the embodiment, the same reference numerals are fixed to elements having the same function in each of the drawings, and redundant descriptions thereof will be not repeated.

Embodiment

An embodiment of a dictionary retrieval device according to the invention will be described next.

FIG. 2 is a block diagram of this embodiment. An input part 1 reads a character string from a file, an input device or the like, and outputs an encoded character string of the input character string. An input character string conversion part 2 converts the input character string input from the input part 1 to input group ID strings by calling a character-group ID conversion part 3. The character-group ID conversion part 3 replaces each character of the character string with a group ID by using a conversion character definition form 4.

The conversion character definition form 4 is formed by classifying a character set $C=c_1, c_2, \ldots, c_n$ into subsets ($G_i \subset C$), and giving a group ID to each subset. A dictionary conversion part 5 converts a notation character string of each word defined in a word dictionary 6 to a notation group ID string by calling the character-group ID conversion part 3, and makes a converted word dictionary 7 which is defined in advance by notation group IDs.

The word dictionary 6 stores words which are significant character strings that appeared at the input part 1. The converted word dictionary 7 stores words which are converted characters of notation part of the word dictionary 6 with group ID by the dictionary conversion part 5 according to the definition of the conversion character definition form 4. A dictionary retrieval part 8 retrieves the converted word dictionary 7 for the input group ID string which is converted in the input character conversion part 2, and outputs the result to an output part 9.

Next, the process of the above-mentioned dictionary retrieval device will be described with reference to FIG. 3.

A character string is read from a file, a keyboard or the like at the input part 1 and is output to the input character string conversion part 2. An example of an incorrect input character string and a corresponding correct character string written in Japanese characters is shown in FIG. 4. In FIG. 4, the pronunciations of each character string are shown in parenthese 6. In FIG. 4, the correct character string "(ko)(n)(pi)(yu)(-)(ta)" means "computer" in English and the symbol "-" indicates a long vowel sound and lengthens the proceeding vowel. In the incorrect character string, a voiced sound for the third character "(pi)" is not indicated, so the third correct character "(pi)" changes to "(hi)".

Figure 3:
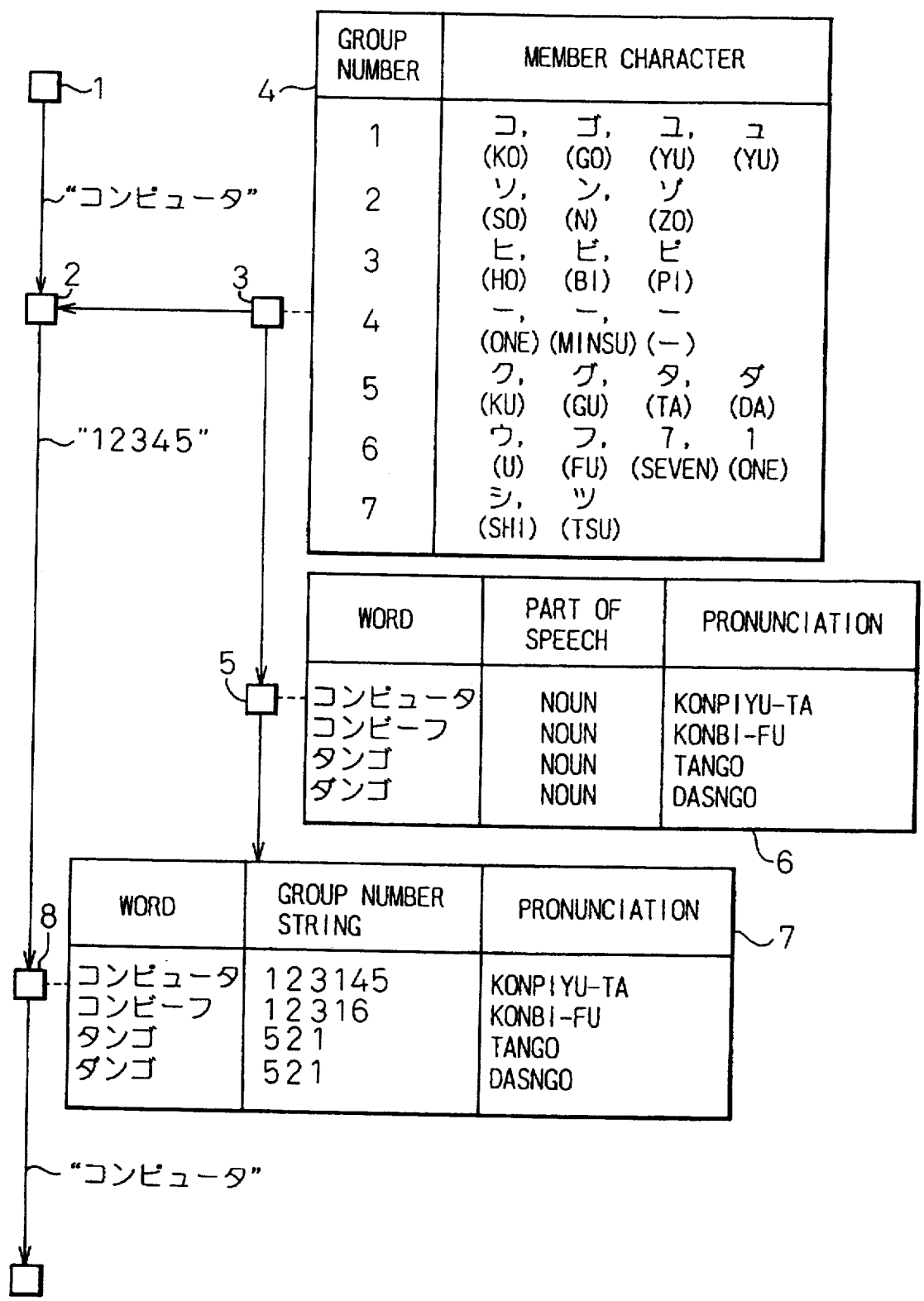
FIG. 3 is a diagram showing a process of FIG. 1.

In FIG. 3, the input character string conversion part 2 converts each character of the character string provided from the input part 1 into group IDs by the character-group ID conversion-part 3.

Figure 5:
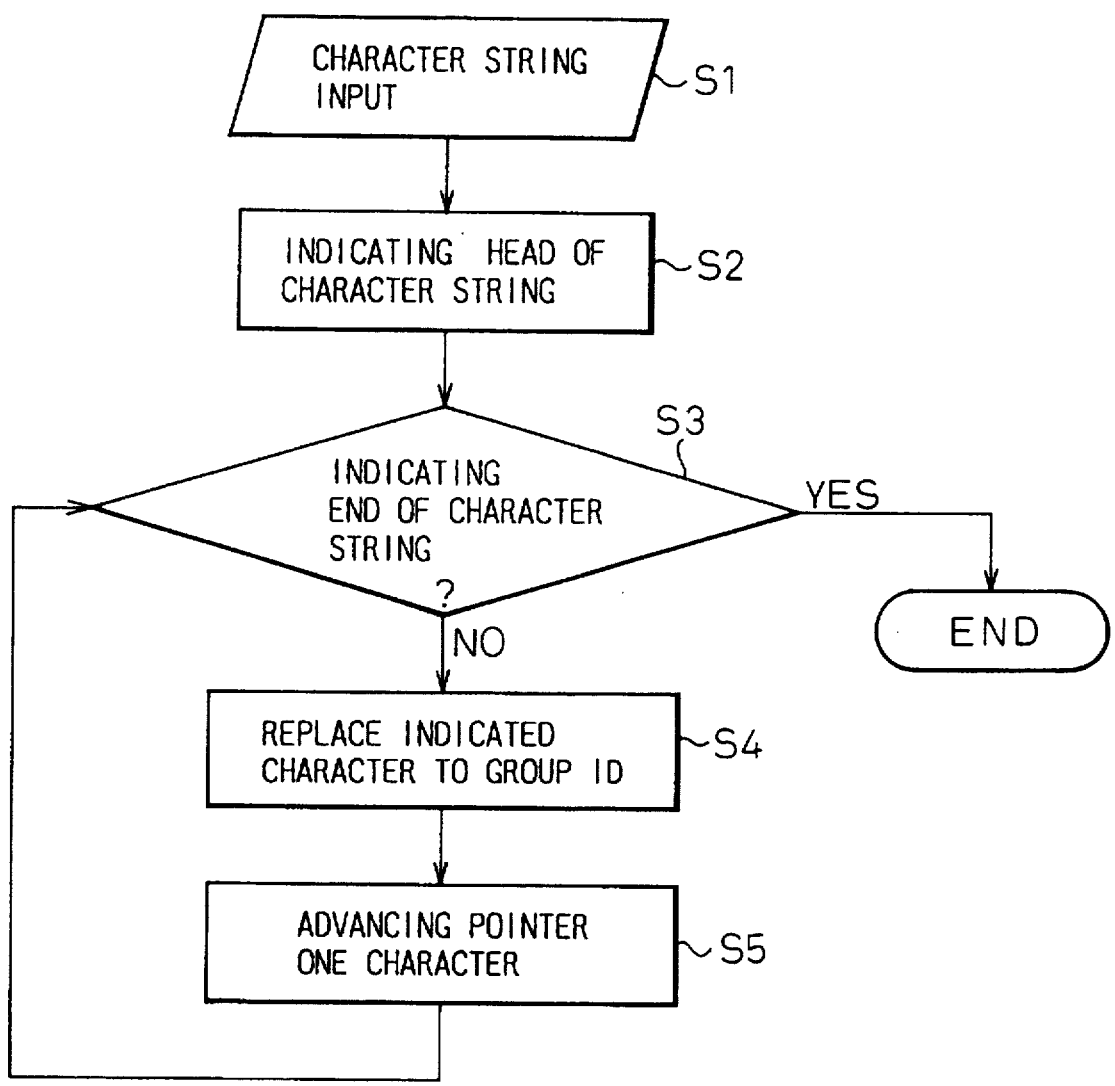
FIG. 5 is a flowchart for explaining the character-group ID conversion part of FIG. 2.

The process of the character-group ID conversion part 3 will be described with reference to a flowchart of FIG. 5.

At step S1, a character string S to be converted is input.

At step S2, a value is set for a pointer p to indicate the head of the character string S.

At step S3, it is judged whether or not the pointer is indicating the end of the character string (after the last character). If the pointer p indicates the end of the character string s, the process ends, and the character string which is converted into a group ID is returned to the dictionary retrieval part 8. If the pointer p does not indicate the end of the character string the process advances to step 4.

At step S4, a character $c_i$ which is indicated by the pointer p is converted into a group ID $g_i$ which is defined by the conversion character definition form 4 shown in FIG. 3.

At step S5, the pointer p is advanced one character, and the process returns to the step 3.

By the above process in FIG. 3, the input character string "(ko)(n)(hi)(yu)(-)(ta)" which is input from the input part 1 to the character string conversion part 2 is converted into an input group ID string "123145", and is output to the dictionary retrieval part 8.

Next, retrieval of the converted word dictionary 7 by the dictionary retrieval part 8 will be described.

The word dictionary 6 stores significant character strings which have appeared at the input part 1. A part of the word dictionary 6 is shown in FIG. 3. In FIG. 3, only notations, pronunciations and parts of speech are shown, but other information about the character strings such as a semantic attribute can be added.

The dictionary conversion part 5 converts the notation character strings of each word defined in the word dictionary 6 group ID strings by calling the character group ID string conversion part 3, and the converted word dictionary 7 stores these group ID strings. A part of the words and corresponding character group strings of the converted word dictionary 7 is shown in FIG. 3.

The dictionary retrieval part 8 retrieves the converted word dictionary 7 for a dictionary element which has a group ID string as a key corresponding to the input group ID string. As a result of the dictionary retrieval for the input group ID string "123145", "(ko)(n)(pi)(yu)(-)(ta) 123145" is retrieved. As described above, by this example, the correct word "(ko)(n)(pi)(yu)(-)(ta)" which could not have been correctly retrieved in the past, can be retrieved from the incorrect word "(ko)(n)(hi)(yu)(-)(ta)".

In the above-mentioned example, the conversion character definition form 4 is formed by similar character sets. However, the conversion character definition form 4 can be formed by sets of pairs of katakana and hiragana, sets of new character styles and old character styles and so on.

As above-mentioned, by regarding the elements of the character string defined in the conversion character definition form 4 as the same, an incorrectly input word which could not have been retrieved in the past can be retrieved.

Further, the construction of the word dictionary 6 and the converted word dictionary 7 can be similar to a word dictionary used in a usual natural language process such as a right truncation compressed construction, or a binary tree construction, or a TRIE construction.

Embodiment 2

By using the dictionary retrieval device of above embodiment 1 as an expanded dictionary retrieval part, a morphology analysis device which analyzes sentences for machine translation, a natural language interface or the like can analyze morphology while allowing input errors. An example of the morphology analysis device which executes this analysis will be described next.

Figure 6:
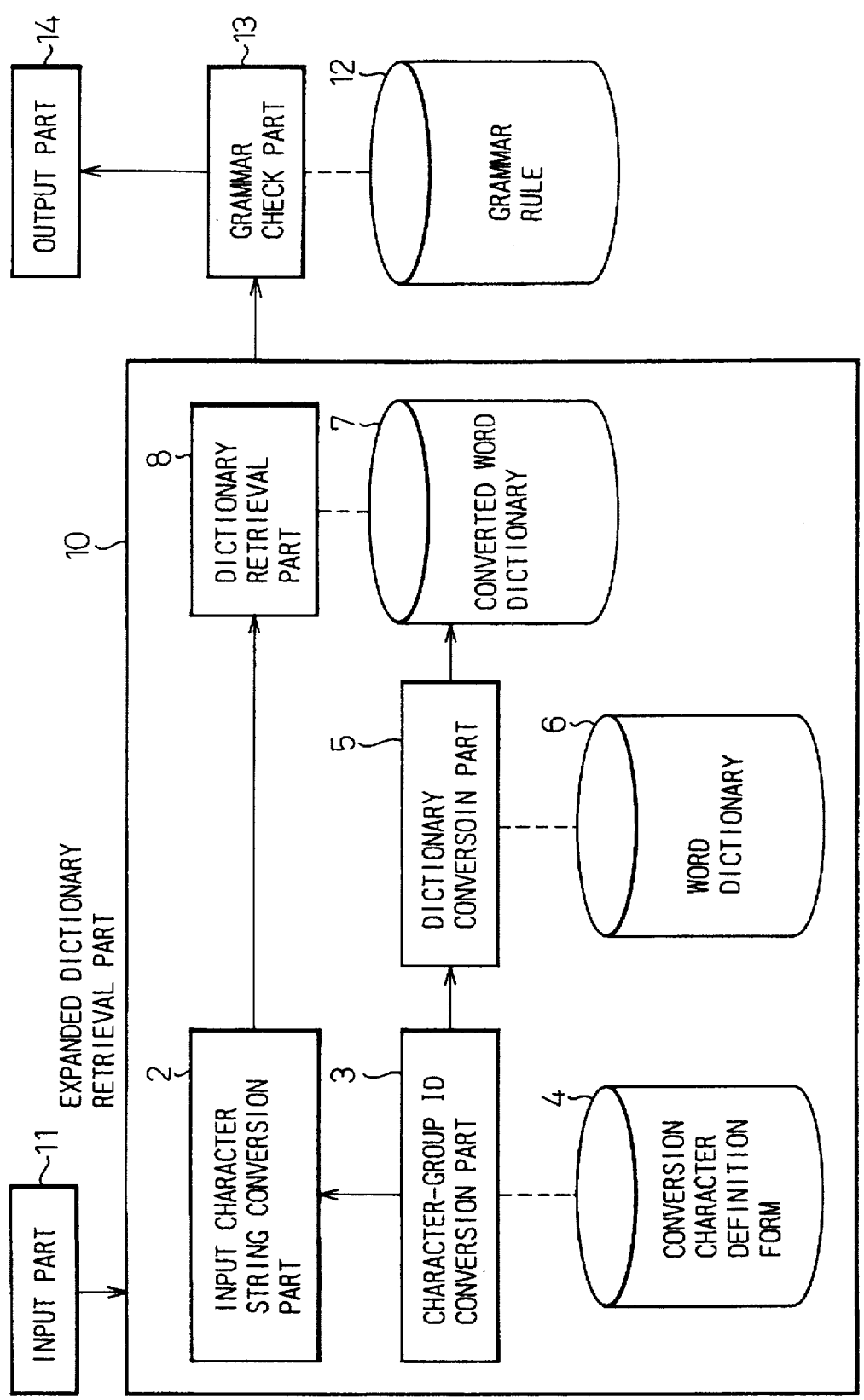
FIG. 6 is a block diagram of the second embodiment according to the present invention.

FIG. 6 is a block diagram of this embodiment. An extended dictionary retrieval part 10 has the same construction as the dictionary retrieval device described in the above embodiment 1. This expanded dictionary retrieval part 10 manages text which is input from an input part 11 described later, retrieves a dictionary starting from a desired position in the text, and controls the retrieval of other candidates and the output by working together with a grammar checking part 13. Each of blocks 2–8 in the extended dictionary retrieval part 10 are equal to the same numbered blocks in FIG. 2.

The input part 11 reads character strings from a file, an input device or the like, and outputs encoded character strings of the input character strings.

A grammar rule 12 defines an input text. A usual grammar rule can be used for this grammar rule 12.

The grammar checking part 13 judges whether or not a morphology string which is output from the extended dictionary retrieval part 10 is in agreement with the grammar rule 12. If not, the grammar checking part 13 requests the extended dictionary retrieval part 10 to output another candidate. For the grammar checking part 13, a method which is used in usual form element analysis, such as a method using an adjacency matrix or context-free grammar rules can be used.

An output part 14 outputs the result of the morphology analysis which judges that the morphology string is in agreement with the grammer rule 12 in the grammar checking part 13.

In this example, an input string which is input from the input part 11 contains a complete sentence. Now, an input string "(ta)(n)(go)(wo)(odo)(ru)" shown in FIG. 7A is input from the input part 11, which means "to dance a tango" in English.

The expanded dictionary retrieval part 10 separates the input character string into character strings, and calls the dictionary retrieval part 8. In this case, the extended dictionary retrieval part 10 calls the dictionary retrieval part 8 for each character string shown as No. 1 to No. 6 in FIG. 7B.

The dictionary retrieval part 8 retrieves the converted word dictionary 7 for a character string of the each character strings. When the retrieval is achieved, the result of the retrieval is returned to the grammar checking part 13.

The grammar checking part 13, similarly to usual morphology analyses, collates the returned word with the grammar rules 12, and continues morphology analyses by advancing a character pointer. If the form element string does not agree with the grammar rules 12, the grammar checking part 13 requests output of another candidate from the dictionary retrieval part 8. The result of the analysis with the dictionary information is the output to the output part 14.

As described above, the analysis device which permits input errors can be providing by providing the analysis device with the extended dictionary part which includes the dictionary retrieval device described in the embodiment 1.

In above-mentioned case, when the input character string s is input to the dictionary retrieval part 8, the dictionary retrieval part 8 retrieves the words in the dictionary for the input character string s. However, it can retrieve the words in the dictionary for character string $s_i = c_1, c_2, \ldots, c_n$ ($i \leq n$) which is the initial part of the character string $s = c_1, c_2, \ldots, c_n$.

Embodiment 3

By using the morphology analysis device of the above embodiment 2, a character string correction device which corrects the error character or standardizes different character styles in the sentence can be realized. The character string correction device will be described hereinafter.

Figure 8:
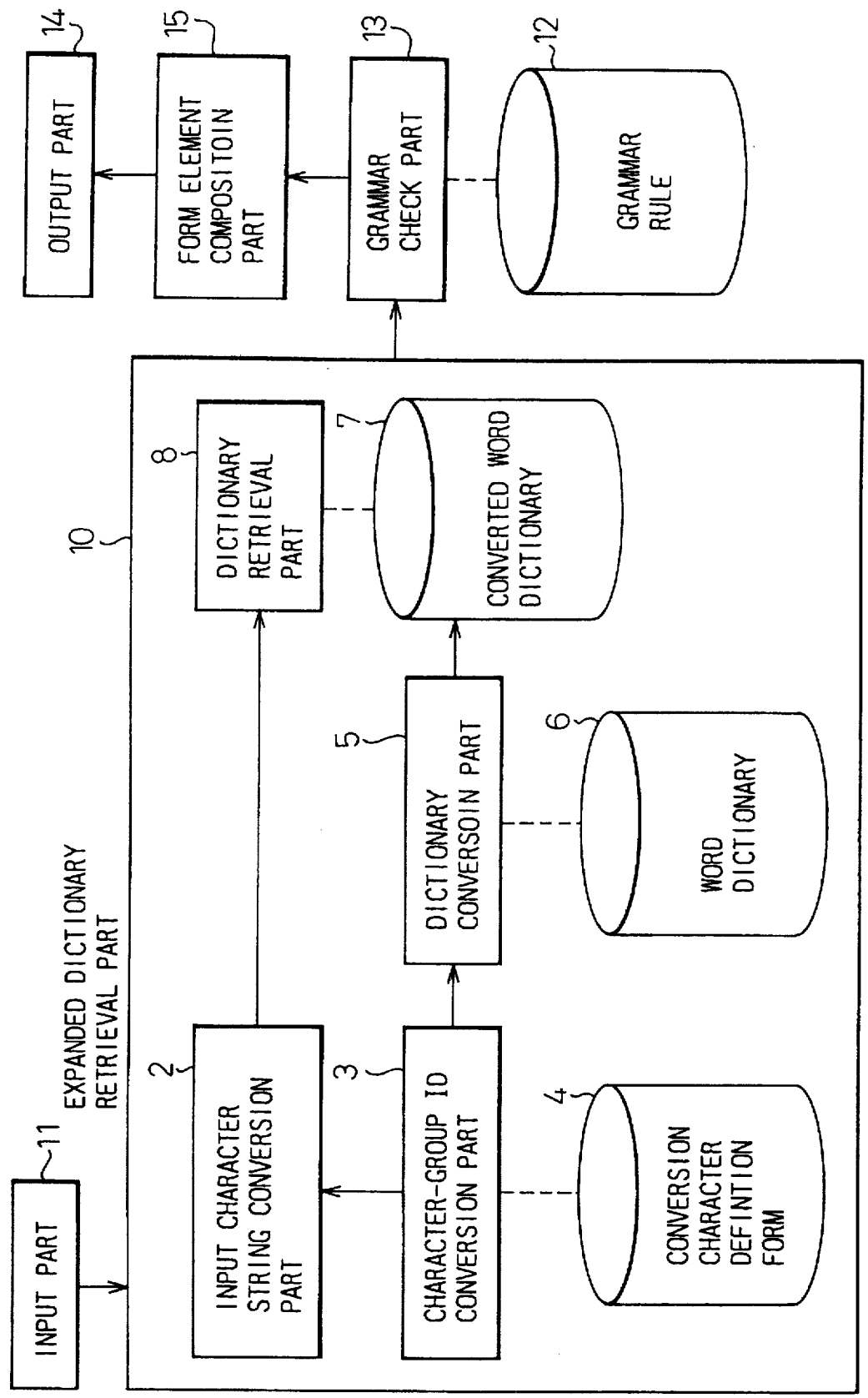
FIG. 8 is a block diagram of the third embodiment according to the present invention.

In FIG. 8, a morphology composition part 15 is established between the grammar checking part 13 and the output part 14. The morphology composition part 15 composes results of the morphology analyses obtained by the grammar checking part 13, and outputs the composed results as text. For example, by consequently outputting notation parts of the morphology string obtained by the grammar checking part 13, text is obtained.

Embodiment 4

By using the dictionary retrieval part of the above embodiment 1 as an extended dictionary retrieval part of an after character recognition processing device, the number of candidate characters at each character position in the after character recognition processing device can be reduced, and the processing speed can be increased.

Figure 9:
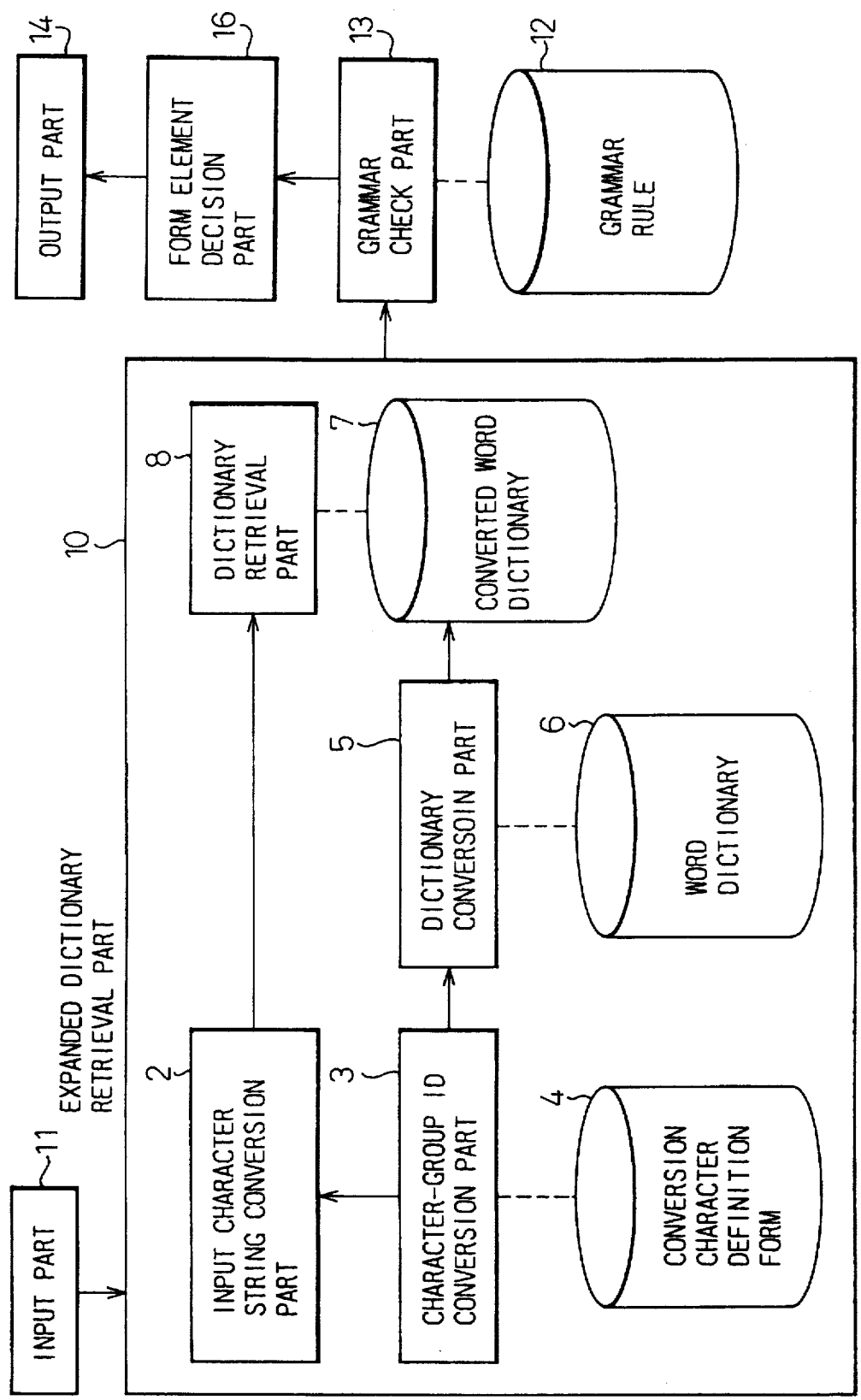
FIG. 9 is a block diagram of the fourth embodiment according to the present invention.

An example of the after character recognition processing device will be described next with reference to FIG. 9.

An input device which recognizes characters, such as a printed character reader, a handwritten character reader or the like, allocates a candidate character set for each character of a read character string. An input part 11 reads the string which has been allocated the candidate character set by the input device, and outputs the string to a dictionary retrieval part 10.

A morphology decision part 16 which is connected between the grammar checking part 13 and the output part 14, decides a candidate rank from plural morphology analysis candidates by using a suitable evaluation function, and outputs the results of the morphology analysis.

Next, the procedure of the after character recognition process of this example will be described.

In this case, an OCR (optical character reader) reads characters "(ko)(n)(pi)(yu)(-)(ta)" shown in FIG. 10. The OCR allocates candidate character sets for each characters by recognizing the character string. As a result, the candidate characters shown in FIG. 10 are allocated for each read character, and the candidate characters are output to the extended dictionary retrieval part 10.

The input character string conversion part 2 converts each of the candidate characters to a group number by using the conversion character definition form 4 in the character-group ID conversion part 3. The contents of the conversion character definition form 4 are shown in FIG. 3. As a result, the group members (1), (2, 7), (3), (1), (4), (5) are obtained.

The dictionary retrieval part 8 obtains two group number strings "123145" and "173145" by these group members, and retrieves a converted word dictionary 7 for these group number strings. As the result of this procedure, the candidates including the word "(ko)(n)(pi)(yu)(-)(ta)" are obtained. These candidates are output into the grammar checking part 13.

When the plural candidates are obtained, the grammar checking part 13 executes the morphology analysis according to grammar rules 12. The morphology decision part 16 decides candidate rank of the plural morphology analysis candidates by using a suitable evaluation function from the result of the morphology analysis, and outputs the morphology analysis candidates to the output part 14.

In embodiment 4, candidate characters at each character position are managed as groups by regarding plural similar characters as one group. Therefore, since the number of candidates at each character position is reduced, the number of groups in which the candidate character appears is reduced to less than the number of candidate characters. Therefore, the after character recognition process device which is improved the speed thereof is obtained.

In this example, when the number of candidate character is reduced to m', the number of group number strings are reduced to k ($\leq$ m) groups. However, since each group is constructed by $N_i$ character elements, in fact, $\Sigma_i^k N_i (\geq m)$ candidate characters come into existence. Therefore, a correct word which could not have been retrieved in the past when the number of the candidate characters is reduced can be retrieved by this example with a good possibility.

Embodiment 5

In the dictionary retrieval device of the above-mentioned embodiment 1, the group number is used as the group ID. However, suitable characters or names can be used instead of the group number.

In this embodiment, a group classification of the conversion character definition form 4 in FIG. 2 of the embodiment 1 is replaced with another coversion character definition form, for example, shown in FIG. 11.

In FIG. 11, the group numbers are replaced by representative characters representing each of the member characters of the groups in the conversion character definition form 4 shown in FIG. 2. Also, the group numbers of the converted word dictionary 7 in FIG. 2 are replaced with these representative characters. The group ID string "(ko)(so)(hi)(ko)(-)(ta)" is given for the word "(ko)(n)(pi)(yu)(-)(ta)".

The another parts of this embodiment are similar to the corresponding parts of the embodiment 1. Also, this dictionary retrieval device can be applied to the extended dictionary retrieval part 10 of the embodiment 2 to 4.

Embodiment 6

At the dictionary retrieval devices in the embodiments 1 and 5, one character belongs to one group according to the group classification of the similar characters in the conversion character definition form 4. However, it is possible to permit one character $c_i$ to belong to plural groups.

In this example, the group classification of the conversion character definition form 4 in FIG. 2 of the embodiment 1 are replaced another conversion character definition form, for example, shown in FIG. 12.

In FIG. 12, a character "(ku)" (with an asterisk "*") is an element of the group number 5 with characters "(gu)", "(ta)", "(da)", and also an element of the group number 6 with "(u)", "(fu)", "(seven)", "(one)". Since one character becomes an element of plural groups, the character-group ID conversion part 3 outputs plural solutions to one character string. However, the number of the candidate words corresponding to the similar character group number string at the converted word dictionary 7 can be reduced by classifying the words "(gu)(ta)(da)" and "(u)(fu)(seven)(one)" into other groups which are not similar to each other.

The other parts of this embodiment are similar to the corresponding parts of the embodiment 1. Also, this dictionary retrieval device can be applied to the extended dictionary retrieval part 10 of the embodiment 2 to 4.

Embodiment 7

In the dictionary retrieval devices in the embodiments 1, 5 and 6, one or more groups is given to each characters. In this example, it is permitted to give group ID g for a character string s=$c_i$, $c_{i+1}$, ..., $C_{i+L}$.

In this example, a character string-group ID part 3' is used instead of the character-group ID conversion part 3, and the group classification of the conversion character definition form 4 in FIG. 3 of the embodiment 1 is replaced with a content, for example, shown in FIG. 13.

In FIG. 13, one kanji "(ka)", one pair of katakana characters "(ka)(ro)" and one pair of kanji characters "(ka)(kuchi)" are classified into a group 1. Similarly, one kanji "(jin)" one pair of katakana characters "(i)(ni)", a second pair of katakana characters "(i)" and a kanji "(ni)" are classified into a group 2, and one kanji "(ketsu)" and one pair of kanji characters "(ito)(kichi)" are classified into a group 3.

As a method for executing the conversion of the character string-group ID, the Aho-Corasick method can be used (Aho, A. and Corasick, M: Efficient String Matching: An Aid to Bibliographic Search, CACM Vol. 18, No. 6 (1975)).

Figure 14:
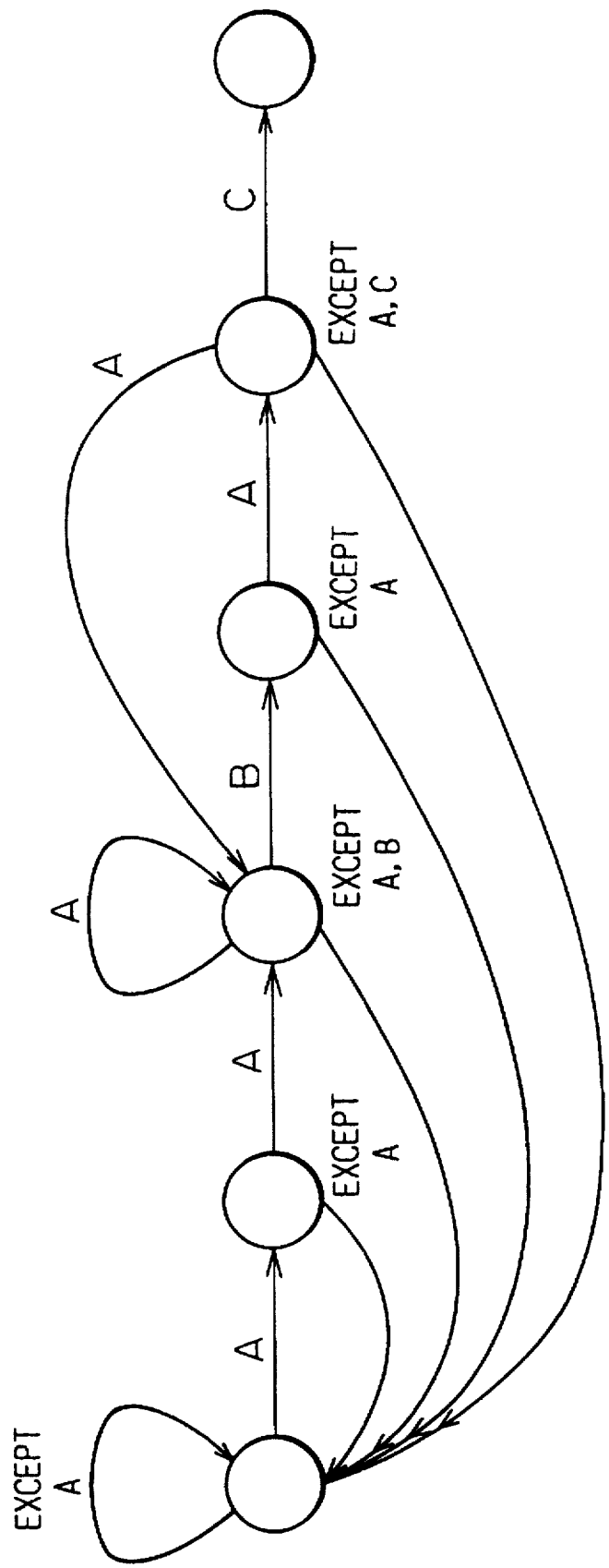
FIG. 14 shows an automaton used in the seventh embodiment according to the present invention.

That is, as shown in FIG. 14, an automaton for pattern collating is created, which memorizes halfway steps of collation as state depending on all conversion character strings defined in the character string-group ID conversion definition form 4. When a disagreement occurs at a state of the automaton, a transition is decided to restart of collation from the halfway. And, by defining the group ID to convert for final state, at the final state, it is converted into the group ID.

By defining the conversion character definition form 4 as described above, even if a character recognition process device such as an OCR device reads the one kanji character "(ka)" of group 1 in FIG. 13 as two katakana characters "(ka)" and "(ro)" of the same group, or reads two kanji characters "(riki)" and "(kuchi)" of the same group combined as one kanji character "ka" of the same group, the dictionary retrieval is executed correctly.

Other parts of this embodiment are similar to corresponding parts of the embodiment 1. This dictionary retrieval device can be applied to the extended dictionary retrieval part 10 of the embodiment 2 to 4, and most suitably to the extended dictionary retrieval part 10 of the after character recognition process device of the embodiment 4.

Embodiment 8

In this example, by progressing the example 7, it is permitted to give a group ID string $g_j$, $g_{j+1}$, ..., $g_{j+k}$ for a character string s=$c_i$, $C_{i+1}$, ..., $C_{i+L}$.

In this example, the group classification of the conversion character definition form 4 in FIG. 3 of the embodiment 1 is replaced with contents, for example, shown in FIG. 15.

In FIG. 15, a group ID 1 is given to one katakana "(ka)" and one kanji "(riki)", a group ID 2 is given to one katakana "(ro)" and one kanji "(kuchi)", group IDs 1 and 2 are given to one kanji "(ka)", a group ID 3 is given to one katakana "(i)", a group ID 4 is given to one katakana "(ni)" and one kanji "(ni)", group IDs 3 and 4 are given to one kanji "(jin)", a group ID 5 is given to one katakana "(hi)", and group IDs 3 and 5 are given to one kanji "(ka)".

In this example, the Aho-Corasick method is applied in the same way as in the embodiment 7, however, when the process reaches the final state, it is possible to convert to the group ID string instead of converting to the group ID.

The other parts of this embodiment are similar to the corresponding parts of the embodiment 1. This dictionary retrieval device can be applied to the extended dictionary retrieval part 10 of the embodiment 2 to 4, and most suitably to the extended dictionary retrieval part 10 of the after character recognition process device of the embodiment 4.

Embodiment 9

In the above-mentioned embodiment 1, 5, 6, 7, 8, a group ID or a group ID string is given to one character or one character string. However, in this example, it is permitted to give a group ID string $g_j, g_{j+1}, \ldots, g_{j+k}$ to an optional pattern expression.

In this example, a character string-group ID conversion part 3' is used instead of the character-group ID conversion part 3. A normal expression conversion is used as an example of the character string-group ID conversion part 3', and the group classification of the conversion character definition form 4 in FIG. 2 of the embodiment 1 is replaced with contents, for example, shown in FIG. 16.

In FIG. 15, "*" in the "(e)(-)( )(to)" is a meta character, and it means that a character just before is continued over 0 times. The pattern string "(e)(-)(to)" is converted to a group ID "4, 101, 20" by normal expression conversion.

In this example, it is possible to treat the patter strings "(e)(-)(to)", "(e)(-)(-)(to)" as the same group.

Other parts of this example are similar to the corresponding parts of the embodiment 1. This dictionary retrieval device can be applied to the expanded dictionary retrieval part 10 of the embodiment 2 to 4.

The following effects are provided by the present invention.

1. A word which could not have been retrieved from a dictionary until now can be retrieved from the dictionary by regarding elements of character sets as same, as defined in a conversion character definition form.
2. Therefore, a document which includes input errors can be correctly analyzed using the morphology analysis.
3. Further, a character string correction device can be obtained, which can standardize character strings or correct erroneous words.
4. By managing candidate characters at each character position of the output of the character recognition process device, the number of the candidate groups at each character position is reduced, and the number of combinations of the candidate character is reduced. Therefore, an after character recognition processing device of which process speed is improved can be obtained.

We claim:

1. A dictionary retrieval device for converting an input character string input from an input part of a computer and outputting the converted character string to an output part of the computer, comprising:

conversion character definition means for classifying a character set into subsets, and providing group IDs for each subset;

character group ID conversion means for converting from each character of the character string to a group ID by using said conversion character definition means;

input character string conversion means for converting the input character string input from the input part to a group ID string using said character-group ID conversion means;

first storage means for storing a word dictionary containing words which are significant character strings appearing at the input part;

dictionary conversion means for converting all words in said word dictionary to the group ID string using said character group ID conversion means;

second storage means for storing a converted word dictionary containing words which are converted by said dictionary conversion means; and dictionary retrieval means for retrieving the converted word dictionary expressed by the group ID for the group ID string converted by said input character string conversion means.

2. A dictionary retrieval device according to claim 1, wherein said conversion character definition means provides a representative character of characters in a group as the group IDs; and said second storage means stores the representative character instead of each character of the input character string in the converted word dictionary.

3. A dictionary retrieval device according to claim 1, wherein said conversion character definition means permits one character to be an element of a set of groups, and said character group ID conversion means outputs plural solutions.

4. A dictionary retrieval device according to claim 1, wherein said conversion character definition means provides a group ID for a character string.

5. A dictionary retrieval device according to claim 1, wherein said conversion character definition means provides a plurality of group IDs for a character string.

6. A dictionary retrieval device according to claim 1, wherein said conversion character definition means provides a plurality of group IDs for a desired pattern expression.

7. A morphology analysis device for analyzing a character string input into a computer, comprising:

dictionary retrieval means for retrieving a dictionary, said dictionary retrieval means including:

conversion character definition means for classifying a character set into subsets, and providing group IDs for each subset, character-group ID conversion means for replacing each character of the character string with group IDs by using said conversion character definition means, input character string conversion means for converting the character string to an input group ID string using said character-group ID conversion means, first storage means for storing a word dictionary containing words which are significant character strings, dictionary conversion means for converting a notation character string of each word which is defined in the word dictionary to a notation group ID string using said character-group ID conversion means, second storage means for storing a converted word dictionary containing words which are converted by said dictionary conversion means, and dictionary retrieval means for retrieving the converted word dictionary expressed by the notation group ID for the input group ID string converted by said input character string conversion means;

grammar rule supply means for supplying a grammar rule; and grammar checking means for executing a morphology analysis by referring to the grammar rule and the converted word dictionary, and for outputting the result of the morphology analysis together with dictionary information.

8. A character string correction device for character strings in sentences inputted into a computer, comprising:

dictionary retrieval means for retrieving a dictionary, said dictionary retrieval means including:

conversion character definition means for classifying a character set $[C=\{C_1, C_2, \ldots, C_n\}]$ into subsets $[(G_1 \subset C)]$, and providing group IDs for each subset, character-group ID conversion means for replacing each character of the character string with group IDs by using said conversion character definition means, input character string conversion means for converting the character strings to input group ID strings using said character-group ID conversion means, first storage means for storing a word dictionary containing words which are significant character strings, dictionary conversion means for converting a notation character string of each word which is defined in the word dictionary to a notation group ID string using said character-group ID conversion means, second storage means for storing a converted word dictionary containing words which are converted by said dictionary conversion means, and dictionary retrieval means for retrieving the converted word dictionary expressed by the notation group ID for each of the input group ID strings converted by said input character string conversion means;

grammar rule supply means for supplying a grammar rule;

grammar checking means for executing a morphology analysis by referring to the grammar rule and the converted word dictionary, and for outputting the result of the morphology analysis together with dictionary information; and morphology composition means provided between said grammar checking means and the output part for outputting sentences by composing the results of the morphology analysis by said grammar checking means.

9. A post-processing device in a computer for character recognition comprising:

input means for inputting candidate character strings which have plural character candidates for each character of an input character string output from a character recognition process device to an expanded dictionary retrieval part;

dictionary retrieval means for retrieving a dictionary, and including:

conversion character definition means for classifying a character set $[C=\{C_1, C_2, \ldots, C_n\}]$ into subsets $[(G_1 \subset C)]$, and providing group IDs for each subset, character-group ID conversion means for replacing each character of the input character string with group IDs by using said conversion character definition means, input character string conversion means for converting the input character string to an input group ID string using said character-group ID conversion means, first storage means for storing a word dictionary containing words which are significant character strings, dictionary conversion means for converting a notation character string of each word which is defined in the word dictionary to a notation group ID string using said character-group ID conversion means, second storage means for storing a converted word dictionary containing words which are converted by said dictionary conversion means, and dictionary retrieval means for retrieving the converted word dictionary expressed by the notation group ID for the input group ID string converted by said input character string conversion means;

grammar rule supply means for supplying a grammar rule;

grammar checking means for executing the morphology analysis by referring to the grammar rule and the converted word dictionary, and for outputting the result of the morphology analysis together with dictionary information; and morphology composition means provided between said grammar checking means and the output part for outputting sentences by composing the results of the morphology analysis by said grammar checking means by using an evaluation function.

10. A computer to translate an input character string of characters into a converted word, comprising:

conversion character definition means for classifying a character set into subsets, providing group identifiers for each of the subsets, and creating a notation group identification string using the group identifiers corresponding to characters in the converted word;

character group identification conversion means for converting the input character string into an input group identification string by replacing each of the characters of the input character string with one of the group identifiers; and dictionary retrieval means for retrieving the converted word corresponding to the notation group identification string matching the input group identification string.

11. The computer as recited in claim 10, wherein said conversion character definition means classifies a character in the character set into a plurality of subsets and said character group identification conversion means converts the input character string into a plurality of input group identification strings when one of the characters in the input character string is provided with a plurality of group identifiers.

12. A method to translate an input character string of characters into a converted word in a computer, comprising the steps of:

(a) classifying a character set into subsets;

(b) providing group identifiers for each of the subsets;

(c) creating a notation group identification string using the group identifiers corresponding to characters in the converted word;

(d) converting the input character string into an input group identification string by replacing each of the characters of the input character string with one of the group identifiers; and (e) retrieving the converted word corresponding to the notation group identification string matching the input group identification string.

13. The method as recited in claim 12, wherein said classifying in step (a) classifies a character in the character set into a plurality of subsets and said converting in step (d) converts the input character string into a plurality of input group identification strings when one of the characters in the input character string is provided with a plurality of group identifiers.

14. The method as recited in claim 12, further comprising the step of (f) performing morphology analysis on a plurality of converted words using a grammar rule.

15. A method to translate an input character string of characters into a converted word in a computer, comprising the steps of:

(a) prestoring notation group identification strings representing converted words using group identifiers assigned to subsets of a character set;

(b) converting the input character string into an input group identification string by replacing each of the characters of the input character string with one of the group identifiers; and (c) retrieving the converted word corresponding to one of the notation group identification strings matching the input group identification string.

* * * * *

UNITED STATES PATENT AND TRADEMARK OFFICE
CERTIFICATE OF CORRECTION

PATENT NO. : 5,615,378
DATED : Mar. 25, 1997
INVENTOR(S) : NISHINO et al.

It is certified that error appears in the above-indentified patent and that said Letters Patent is hereby corrected as shown below:

Col. 6, line 12, change "parenthese 6." to --parentheses.--.

Signed and Sealed this

Twenty-fourth Day of June, 1997

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO.   : 5,615,378
DATED        : Mar. 25, 1997
INVENTOR(S)  : NISHINO et al.

It is certified that error appears in the above-indentified patent and that said Letters Patent is hereby corrected as shown below:

Col. 13, line 17 (Claim 8, line 6), delete "$[C=\{C_1, C_2 \ldots, C_n\}]$";
line 18 (Claim 8, line 7), delete "$[(C_1 \subset C)]$";
line 60 (Claim 9, line 11), delete "$[C=\{C_1, C_2 \ldots, C_n\}]$";
line 61 (Claim 9, line 12), delete "$[(C_1 \subset C)]$".

Signed and Sealed this

Twenty-ninth Day of July, 1997

Attest:

BRUCE LEHMAN

*Attesting Officer*      Commissioner of Patents and Trademarks